(12) United States Patent
Chen et al.

(10) Patent No.: US 9,170,374 B2
(45) Date of Patent: Oct. 27, 2015

(54) BROADBAND, GROUP INDEX INDEPENDENT, AND ULTRA-LOW LOSS COUPLING INTO SLOW LIGHT SLOTTED PHOTONIC CRYSTAL WAVEGUIDES

(75) Inventors: Ray T. Chen, Austin, TX (US); Che-Yun Lin, Portland, OR (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 14/125,719

(22) PCT Filed: Jun. 13, 2012

(86) PCT No.: PCT/US2012/042218
§ 371 (c)(1),
(2), (4) Date: Apr. 15, 2014

(87) PCT Pub. No.: WO2013/048596
PCT Pub. Date: Apr. 4, 2013

(65) Prior Publication Data
US 2014/0219602 A1 Aug. 7, 2014

Related U.S. Application Data

(60) Provisional application No. 61/496,474, filed on Jun. 13, 2011.

(51) Int. Cl.
*G02B 6/26* (2006.01)
*G02B 6/14* (2006.01)
(Continued)

(52) U.S. Cl.
CPC . *G02B 6/26* (2013.01); *B82Y 20/00* (2013.01); *G02B 6/10* (2013.01); *G02B 6/1225* (2013.01); *G02B 6/14* (2013.01); *G02B 2006/121* (2013.01); *G02B 2006/1213* (2013.01)

(58) Field of Classification Search
USPC .......................................................... 385/43
See application file for complete search history.

(56) References Cited

U.S. PATENT DOCUMENTS

| 7,027,547 B1 | 4/2006 | Hwang |
| 7,231,122 B2 | 6/2007 | Weisberg et al. |

(Continued)

FOREIGN PATENT DOCUMENTS

| WO | 2004021056 | 3/2004 | |
| WO | WO 2004/021056 | * 3/2004 | ............... G02B 6/12 |
| WO | 2013048596 | 4/2013 | |

OTHER PUBLICATIONS

Korea Intellectual Property Office (ISA), International Search Report and Written Opinion for PCT/US2012/042218 dated Apr. 25, 2013, 9 pp.

(Continued)

*Primary Examiner* — Eric Wong
(74) *Attorney, Agent, or Firm* — Daniel J. Chalker; Edwin S. Flores; Chalker Flores, LLP (57) ABSTRACT

The present invention provides a waveguide coupler configured to optically couple a strip waveguide to a first slot photonic crystal waveguide, wherein the slot photonic crystal waveguide has a lattice constant, an air hole diameter, a slot width and a first line defect waveguide width. The waveguide coupler includes a group reflective index taper having a second slot photonic crystal waveguide disposed between and aligned with the first slot photonic crystal waveguide and the strip waveguide. The second slot photonic crystal waveguide has a length, the lattice constant, the air hole diameter, the slot width, and a second line defect waveguide width that is substantially equal to the first line defect waveguide width adjacent to the first slot photonic crystal waveguide and decreases along the length of the second photonic crystal waveguide.

25 Claims, 5 Drawing Sheets

(51) Int. Cl.
*G02B 6/122* (2006.01)
*G02B 6/10* (2006.01)
*B82Y 20/00* (2011.01)
*G02B 6/12* (2006.01)

(56) References Cited

U.S. PATENT DOCUMENTS

| | | | |
|---|---|---|---|
| 7,242,837 | B2 | 7/2007 | Talneeau et al. |
| 7,440,658 | B2 | 10/2008 | Furuya et al. |
| 7,535,944 | B1 | 5/2009 | Guilfoyle et al. |
| 2010/0310208 | A1 | 12/2010 | Wang et al. |
| 2013/0310208 | A1 | 12/2010 | Wang et al. |

OTHER PUBLICATIONS

Almeida, et al., "Guiding and confining light in void nanostructure" Opt. Lett. 29, 1209-1211, Jun. 1, 2004.

Baba, Toshihiko "Slow light in photonic crystals" Nature Photonics 2, 465-473, Aug. 2008.

Brosi, et al. "High-speed low-voltage electro-optic modulator with a polymer-infiltrated silicon photonic crystal waveguide" Optics Express 16, 4177 (Mar. 17, 2008).

Chen, et al., "20dB-enhanced coupling to slot photonic crystal waveguide using multimode interference coupler," Appl. Phys. Lett. 91, 091111 (published online Aug. 28, 2007).

Chen, et al., "Diode-laser-pumped high efficiency continuous-wave operation at 912 nm laser in Nd:GdVO4 crystal" Opt. Lett. 34, 602 (published online Sep. 22, 2008).

Di Falco, et al., "Dispersion control and slow light in slotted photonic crystal waveguides" Appl. Phys. Lett. 92, 083501 (published online Feb. 25, 2008).

Di Falco, et al., "Photonic crystal slotted slab waveguides" Photonics and Nanostructures—Fundamentals and Applications 6, 38-41 (Available online Aug. 25, 2007).

Krauss, T.F. "Slow light in photonic crystal waveguides" J. Phys. D: Appl. Phys. 40, 2666-2670 (published Apr. 19, 2007).

Lai, et al., "On-chip methane sensing by near-IR absorption signatures in a photonic crystal slot waveguide" Opt. Lett. 36, 984-986 (Mar. 15, 2011).

Lai, et al., "Photonic crystal slot waveguide absorption spectrometer for on-chip nearinfrared spectroscopy of xylene in water" Appl. Phys. Lett. 98, 023304 (published online Jan. 13, 2011).

Lin, et al., Electro-optic polymer infiltrated silicon photonic crystal slot waveguide modulator with 23 dB slow light enhancement Appl. Phys. Lett. 97, 093304 (published online Sep. 3, 2010).

Lin, et al., "Wideband group velocity independent coupling into slow light silicon photonic crystal waveguide" Appl. Phys. Lett. 97, 183302 (published online Nov. 4, 2010).

Lin, et al., "Coupling loss minimization of slow light slotted photonic crystal waveguides using mode matching with continuous group index perturbation" Optics Letters, vol. 37, No. 2, Jan. 15, 2012.

Pottier, et al., "Efficient coupling into slow-light photonic crystal channel guides using photonic crystal tapers," Opt. Express vol. 15, Issue 11, pp. 6569-6575 (May 28, 2007).

Scullion, et al., "High Efficiency Interface for Coupling Into Slotted Photonic Crystal Waveguides" IEEE Photon. Journal, vol. 3, No. 2, pp. 203-2011 (Apr. 2011).

Vlasov, et al. "Coupling into the slow light mode in slab-type photonic crystal waveguides" Opt. Lett. vol. 31, Issue 1, pp. 50-52 (Jan. 1, 2006).

Wang, et al., "Ultracompact low-loss coupler between strip and slot waveguides" Opt. Lett. vol. 34, Issue 10, pp. 1498-1500 (May 15, 2009).

Wang, et al. "Effective in-device r33 of 735 pm/V on electro-optic polymer infiltrated silicon photonic crystal slot waveguides" Opt. Lett. vol. 36, Issue 6, pp. 882-884 (Mar. 15, 2011).

Korea Intellectual Property Office (ISA), International Preliminary Report on Patentability for PCT/US2012/042218 dated Jan. 3, 2014, 6 pp.

\* cited by examiner

BROADBAND, GROUP INDEX INDEPENDENT, AND ULTRA-LOW LOSS COUPLING INTO SLOW LIGHT SLOTTED PHOTONIC CRYSTAL WAVEGUIDES

CROSS-REFERENCE TO RELATED APPLICATIONS

This application is the National Stage of International Application No. PCT/US2012/042218, filed on Jun. 13, 2012 claiming the priority of U.S. Provisional Application Ser. No. 61/496,474, filed Jun. 13, 2011, the content of each of which is incorporated by reference herein.

STATEMENT OF FEDERALLY FUNDED RESEARCH

This invention was made with U.S. Government support under Contract Nos. FA 9550-08-1-0394 and FA 9550-09-C-0086 awarded by the Air Force Office of Scientific Research (AFOSR). The government has certain rights in this invention.

TECHNICAL FIELD OF THE INVENTION

The present invention relates in general to the field of ultra-compact optical devices, and more particularly, to an approach to efficiently couple light into slow light waveguide devices by the design of a slotted photonic crystal waveguide.

REFERENCE TO A SEQUENCE LISTING

None.

BACKGROUND OF THE INVENTION

Without limiting the scope of the invention, its background is described in connection with photonic crystal waveguides (PCW). Introducing line defects into a photonic crystal lattice permits an electromagnetic wave having a frequency within the bandgap of the structure to be guided through the photonic crystal. The line defects resemble waveguides, and may be formed by either adding or removing dielectric material to a certain row or column along one of the directions of the photonic crystal lattice. Thus, PCWs can be used as an optical "wire" to guide an optical signal between different points, or devices, within an optical integrated circuit.

Slotted photonic crystal waveguides offer a unique platform that merges the best properties of slot waveguides and photonic crystal waveguides (PCW): strong optical confinement in slot waveguides [1] and slow light-enhanced light-matter interaction in photonic crystal waveguides. [2] In a W1 PCW, the optical mode profile spreads deeper into the photonic lattice with reduced group velocity. [3] This lateral spread reduces optical confinement and increases propagation loss for slow light modes, which can weaken some of the benefits derived from the slow light effect. By contrast, in slotted PCW, optical confinement does not decrease with increased group index, as a result of the high index contrast in silicon platform. In a high index contrast interface, a transverse electric (TE) guided mode is required to have much higher intensity in the low index region as stated by Maxwell's equations. Consequently, when approaching the edge of the photonic bandgap, the percentage of energy concentration in the low index slot will increase rather than decrease. [4] The increasing optical confinement with slower group velocity is a very advantageous property for compact optical communication [4-6] and sensor devices [7,8] that require strong light-matter interaction and high optical confinement simultaneously. Despite the benefits derived from strong confinement and slow light enhancement, optical coupling between a strip waveguide and a slotted PCW is more challenging than conventional PCW due to the exotic mode profile and slow group velocity in the slotted PCW. Without a properly designed interface between a strip waveguide and a slotted PCW, strongly confined guided mode profile with minimal overlap and large group index mismatch result in negligible coupling and a transmission spectrum that is nearly indistinguishable from noise [9]. Efforts to improve the coupling efficiency between a strip waveguide and a slotted PCW include using a multi-mode interference (MMI) coupler [9], changing the termination of the slot with respect to the coupler interface [10,11], and resonant coupling [15]. Using an MMI coupler to improve mode-matching yields less than 5 dB insertion at the peak wavelength. However, efficient coupling is achieved only within a narrow bandwidth. Changing the slot termination profile achieves good coupling with significantly better bandwidth [10], but the overall transmission is low, and Fabry-Perot fringes manifest due to significant reflections. Resonant coupler approach shows better coupling efficiency. However, the transmission dip below −10 dB in slow light region weakens the performance of slow light devices. By contrast, the theoretical study in [16] suggests that good coupling is achievable with good mode profile and group index matching.

As a result, photonic crystal waveguides are a very promising platform for ultra-compact optical devices with relatively low power consumption. However, optical loss in photonic crystal waveguides is the most significant stumbling block, and coupling loss in photonic crystal devices is the dominant optical loss.

For example, U.S. Pat. No. 7,231,122 issued to Weisberg et al. (2007) features an apparatus that includes a photonic crystal fiber configured to guide a mode of electromagnetic radiation at a wavelength, λ, along a waveguide axis. The fiber includes a core extending along the waveguide axis, and a confinement region extending along the waveguide axis and surrounding the core. The confinement region includes alternating layers of a first and a second dielectric material having thicknesses $d_1$ and $d_2$ and different refractive indices $n_1$ and $n_2$, respectively. The thickness of at least one of the alternating layers of the first material differs from thickness $d_1^{QW}$ or at least one of the alternating layers of the second material differs from thickness $d_2^{QW}$, where $d_1^{QW}$ and $d_2^{QW}$ correspond to a quarter-wave condition for the two dielectric materials given by $d_1^{QW}=\lambda/(4\sqrt{(n_1^2-1)})$ and $d_2^{QW}=\lambda/(4\sqrt{(n_2^2-1)})$, respectively. The photonic crystal fiber has an attenuation for the guided mode at the wavelength λ that is reduced by a factor of about two or more relative to an attenuation for a reference fiber that is identical to the photonic crystal fiber except that the reference fiber has alternating layer thicknesses corresponding to the quarter-wave condition.

U.S. Pat. No. 7,535,944 issued to Guilfoyle (2009) discloses a photonic crystal/waveguide coupler for VCSELS and photodetectors. The optical coupler of the Guilfoyle invention comprises first and second mirrors. The first mirror is positioned with respect to the second mirror so that a resonant cavity is defined between them. A waveguide structure is positioned in the resonant cavity and includes a photonic crystal coupler. A thickness of the resonant cavity is selected so that a phase matching condition is satisfied for resonance in the resonant cavity. At least one of the first and second mirrors may be formed from a structure in an optoelectronic device.

Alternatively, at least one of the first and second mirrors is formed from a semiconductor layer. At least one of the first and second mirrors may be formed as a semiconductor distributed bragg reflector, or as a dielectric distributed bragg reflector. At least one of the first and second mirrors may be a mirror in a vertical cavity surface emitting laser (VCSEL) structure. The photonic crystal coupler structure may be shaped so that first order modes of light incident upon the photonic crystal coupler structure are coupled into the waveguide while zero-order modes are reflected out into the resonant cavity and reflected by the mirror.

SUMMARY OF THE INVENTION

The present invention describes an approach to efficiently couple light into slow light waveguide devices. The present invention has applications in optical communication systems and as environmental sensors because of its compact (300 µm long), on-chip spectrometer with very high sensitivity for greenhouse gas detection and underground water pollution sensing. In one embodiment, the present invention has a number of features that differ from the existing designs and technology, these include (a) a parabolic taper of slotted photonic crystal waveguide based on changing the position of air holes, (b) an optical mode converter that can transform a strip waveguide mode into a slotted photonic crystal waveguide mode while being able to maintain electrical isolation at the same time, and (c) an efficient and easy to fabricate design based on an experimentally verified approach to efficiently couple light into a slow light slotted photonic crystal waveguide.

The present invention drastically improves the coupling efficiency to slow light slotted photonic crystal waveguide by 30 dB. The present invention represents a simple, robust and experimentally proven design that can be fabricated with high yield. The present invention represents the only approach that is proven by both numerical simulation and experiment that improves the coupling efficiency to slow light slotted photonic crystal waveguide by 30 dB. The present invention comprises an ultra-compact group index taper only 5.1 µm long and an ultra-compact optical mode converter only 5.95 µm long.

In one embodiment, the present invention provides a waveguide coupler configured to optically couple a strip waveguide to a first slot photonic crystal waveguide, wherein the slot photonic crystal waveguide has a lattice constant, an air hole diameter, a slot width and a first line defect waveguide width. The waveguide coupler includes a group reflective index taper having a second slot photonic crystal waveguide disposed between and aligned with the first slot photonic crystal waveguide and the strip waveguide. The second slot photonic crystal waveguide has a length, the lattice constant, the air hole diameter, the slot width, and a second line defect waveguide width that is substantially equal to the first line defect waveguide width adjacent to the first slot photonic crystal waveguide and decreases along the length of the second photonic crystal waveguide.

In another embodiment, the present invention provides an optical apparatus that includes a photonic crystal waveguide having a first region and a second region. The photonic crystal waveguide includes a slab formed of a first material on a substrate, and a slot formed in the slab. The first region of the photonic crystal waveguide has a first line defect waveguide width and a first array of columnar members formed of a second material within the slab on both sides of the slot. The second region of the photonic crystal waveguide has a length, a second line defect waveguide width that is substantially equal to the first line defect waveguide width adjacent to the first region and decreases along the length of the second region, and a second array of columnar members formed of the second material within the slab on both sides of the slot, wherein the positioning of the columnar members in the second array are altered to achieve the decreasing second line defect waveguide width.

Either of these embodiments may also include a strip waveguide having a tapered end with a gradually decreasing width and an optical mode converter disposed between and aligned with the strip waveguide and either the group reflective index taper or the second portion of the photonic crystal waveguide. The optical mode converter includes two side waveguides on each side of at least a portion of the tapered end of the strip waveguide and positioned in close proximity to the tapered end of the strip waveguide, wherein a width of each side waveguide gradually decreases from the group reflective index taper to an end of the side waveguide.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "waveguide" refers to optical components having a core of material surrounded by cladding, with both the core and cladding being transparent to light and having a respective index of refraction. The core may be a buried structure, in which case it is completely surrounded by cladding. Alternatively, the core may be a ridge or strip structure, in which case it is partially surrounded by cladding, and partially surrounded by another medium such as, for example, air or a vacuum having respective index of refraction.

As used herein in the specification and in the claims the term "parabolic" relates to a structure that generally curved or bowl shaped in cross-section and is not intended to be limitative to the mathematical definition of the term "parabolic".

As used herein the term "frequency" refers to the distance between two adjacent wave crests or wave troughs of the differential waveform.

The term "impedance matching" as used herein is intended to include all the measures for reducing reflection caused by a difference in impedance between two different connection terminals when one output terminal and one input terminal are connected with each other.

The term "bandgap" as used herein refers the difference between the conduction band energy level and the valance band energy level at a given point in a material.

The present invention demonstrates highly efficient coupling into a slow light slotted photonic crystal waveguide (PCW). The design of the present invention comprises optical mode converters and group index tapers that provide good optical mode matching and impedance matching, a nearly flat transmission over the entire guided mode spectrum of 68.8 nm range with 2.4 dB minimum insertion loss. Measurements conducted herein show up to 20 dB baseline enhancement and 30 dB enhancement in the slow light region, indicating that it is possible to design highly efficient and compact devices that benefit from the slow light enhancement without increasing the coupling loss.

In one embodiment, the present invention provides a waveguide coupler configured to optically couple a strip waveguide to a first slot photonic crystal waveguide, wherein the slot photonic crystal waveguide has a lattice constant, an air hole diameter, a slot width and a first line defect waveguide width. The waveguide coupler includes a group reflective index taper having a second slot photonic crystal waveguide disposed between and aligned with the first slot photonic crystal waveguide and the strip waveguide. The second slot photonic crystal waveguide has a length, the lattice constant, the air hole diameter, the slot width, and a second line defect waveguide width that is substantially equal to the first line defect waveguide width adjacent to the first slot photonic crystal waveguide and decreases along the length of the second photonic crystal waveguide.

In another embodiment, the present invention provides an optical apparatus that includes a photonic crystal waveguide having a first region and a second region. The photonic crystal waveguide includes a slab formed of a first material on a substrate, and a slot formed in the slab. The first region of the photonic crystal waveguide has a first line defect waveguide width and a first array of columnar members formed of a second material within the slab on both sides of the slot. The second region of the photonic crystal waveguide has a length, a second line defect waveguide width that is substantially equal to the first line defect waveguide width adjacent to the first region and decreases along the length of the second region, and a second array of columnar members formed of the second material within the slab on both sides of the slot, wherein the positioning of the columnar members in the second array are altered to achieve the decreasing second line defect waveguide width.

Either of these embodiments may also include a strip waveguide having a tapered end with a gradually decreasing width and an optical mode converter disposed between and aligned with the strip waveguide and either the group reflective index taper or the second portion of the photonic crystal waveguide. The optical mode converter includes two side waveguides on each side of at least a portion of the tapered end of the strip waveguide and positioned in close proximity to the tapered end of the strip waveguide, wherein a width of each side waveguide gradually decreases from the group reflective index taper to an end of the side waveguide.

As will be described in more detail below, the second line defect waveguide width decreases parabolically. For example, the first line defect waveguide width is about $1.3\sqrt{3}a$ and the second line defect waveguide width decreases to about $1.25\sqrt{3}a$ where a is the lattice constant. Moreover, the length of the second slot photonic crystal waveguide can be determined by a maximum difference between the first line defect waveguide width and the second line defect waveguide width. In one embodiment, the length of the second slot photonic crystal waveguide is about 5.1 µm or less, and a length of the optical mode converter is about 5.95 µm or less. The apparatus can improve a coupling efficiency from the strip waveguide to the first photonic crystal waveguide by about 20 dB (baseline) and by about 30 dB in a slow light region. The slot can be filled with at least one of silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, intrinsic silicon, alloys thereof, and organic polymers. The first material can be at least one of silicon, germanium, carbon, gallium nitride, gallium arsenide, gallium phosphide, indium nitride, indium phosphide, aluminum arsenide, zinc oxide, silicon oxide, silicon nitride, alloys thereof, and organic polymers. The second material can be a least one of air, silicon oxide, silicon nitride, alumina, zinc oxide, alloys thereof, and organic polymers.

The present invention can be integrated into a sensor, an optical communication system, a router, a modulator, a switch, a tunable optical filter or a fully embedded board level interconnect. For example, when the present invention is integrated into a sensor, one or more samples can be deposited within at least a portion of the first photonic crystal waveguide or the second photonic crystal waveguide. The one or more samples may include analytes, environmental pollutants, greenhouse gases, water pollutants, contaminants, or any combinations thereof.

Figure 1:
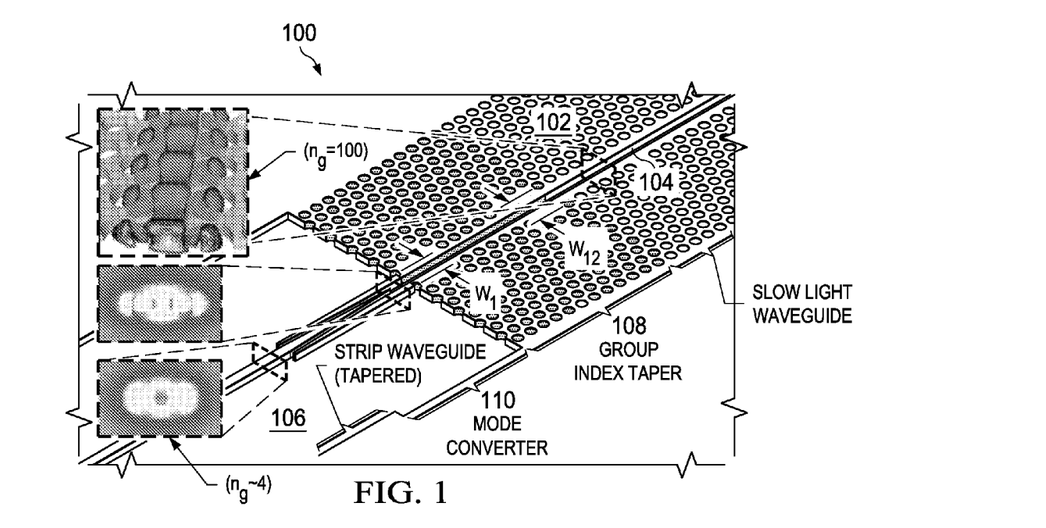
FIG. 1 shows a schematic of the slow light slotted PCW, group index taper, mode converter, and strip waveguide (tapered) in accordance with one embodiment of the present invention.

FIG. 1 shows a schematic of the slow light slotted PCW, group index taper, mode converter, and strip waveguide (tapered). The insets show the mode profiles of a strip waveguide and a slow light slotted PCW at high group index ($n_g=100$). The slotted PCW 100 is a line defect structure with a nanometer-size center slot 104 embedded in a photonic crystal slab 102. The slotted PCW devices 100 are formed by etching air holes and slots on a 230 nm crystalline silicon nanomembrane sandwiched between a 3 µm thick silicon dioxide layer (n=1.46) 106 and a 2 µm thick polymer layer (n=1.63), which serves as the bottom and top cladding layers, respectively. Air holes and slots are filled with the same material as the top cladding in the same step, which also prevents undesirable oxidation of the silicon nanomembrane that mutes the slow light effect. The lattice constant (a), air hole diameter (d), slot width (sw), silicon thickness (h), and line defect waveguide width ($W_{12}$) for the slow light waveguide are chosen to be a=425 nm, d=297 nm, sw=320 nm, h=230 nm, and $W_{12}=1.3\sqrt{3}a$ so that this waveguide supports a defect-guided mode that falls inside the observation window of 1520~1610 nm.

Figure 2A:
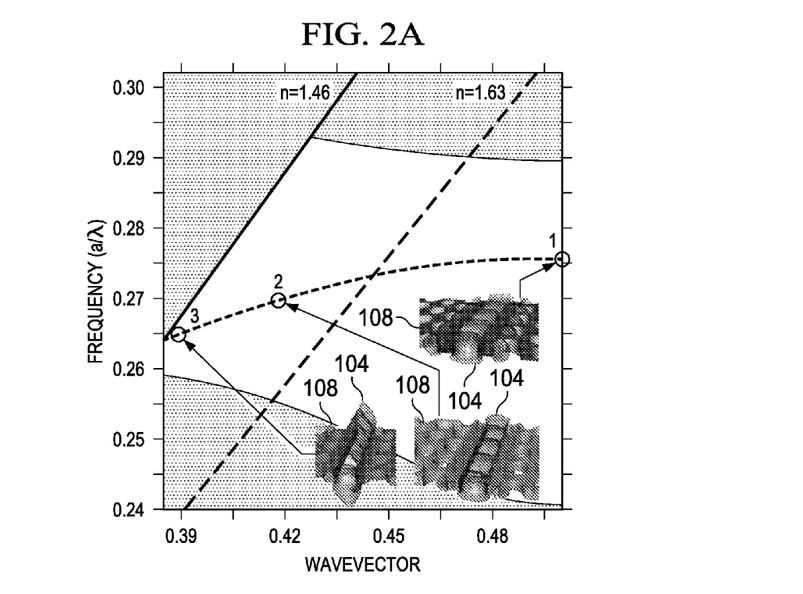
FIG. 2A is a band diagram in normalized frequency and wave vector units in accordance with one embodiment of the present invention.

FIG. 2A is a band diagram in normalized frequency and wave vector units in accordance with one embodiment of the present invention. Lattice constant a=425 nm, silicon slab thickness d=230 nm, hole diameter d=297 nm, and slot width sw=320 nm. The inset shows the waveguide width in the group index taper region 108 in FIG. 1. The bandgap region is highlighted.

Figure 4:
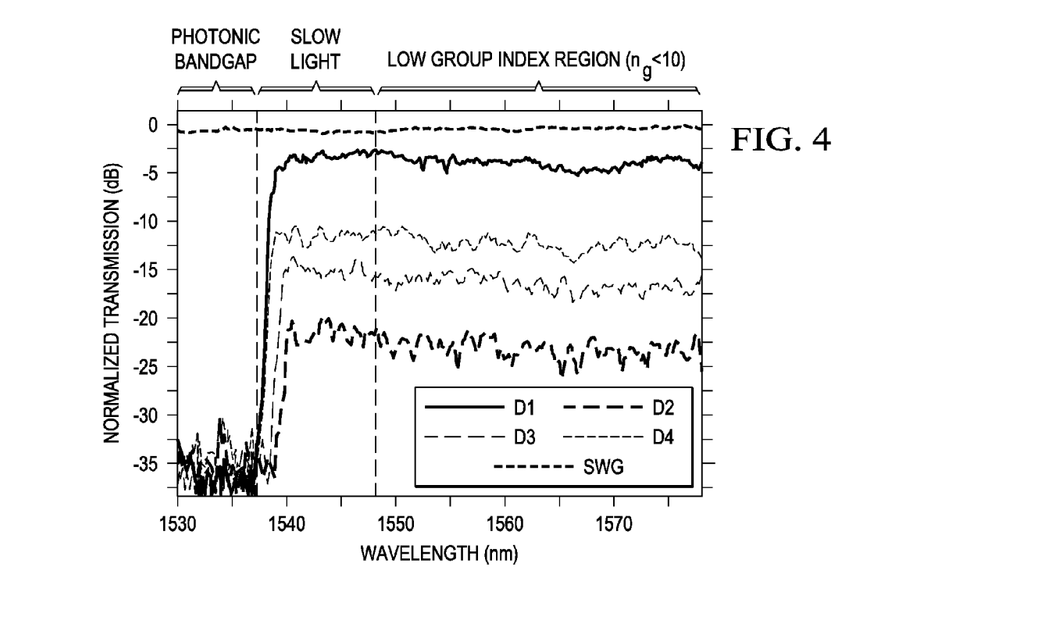
FIG. 4 shows the transmission spectra of D1, D2, D3, and D4.

The photonic band diagram for the slow light waveguide is shown in FIG. 2A. The inplane electric field distributions of the guided mode at wave vectors below and above polymer light line are also shown in the inset of FIG. 2A. The radiation loss above polymer light line is small for the length of the devices. Therefore it is possible to have transmission between polymer light line (n=1.63) and oxide light line (n=1.46). This was also verified experimentally as shown in FIG. 4. To minimize the modal mismatch, the present inventors used an optical mode converter 110 that can convert a strip waveguide mode into a conventional slot waveguide mode [12], which has a mode profile similar to that of a slotted photonic crystal waveguide (see FIG. 1). [1,4] To further improve mode profile matching with a strip waveguide, a wide slot width of 320 nm was intentionally chosen, a maximum width that can still support a slot mode with best mode profile match. For a photonic crystal modulator operating in the slow light region, the increased slow light mode coupling efficiency and relaxed fabrication requirements compensate for the loss in optical confinement, leading to better overall performance with a wider slot. [4,5].

Figure 2B:
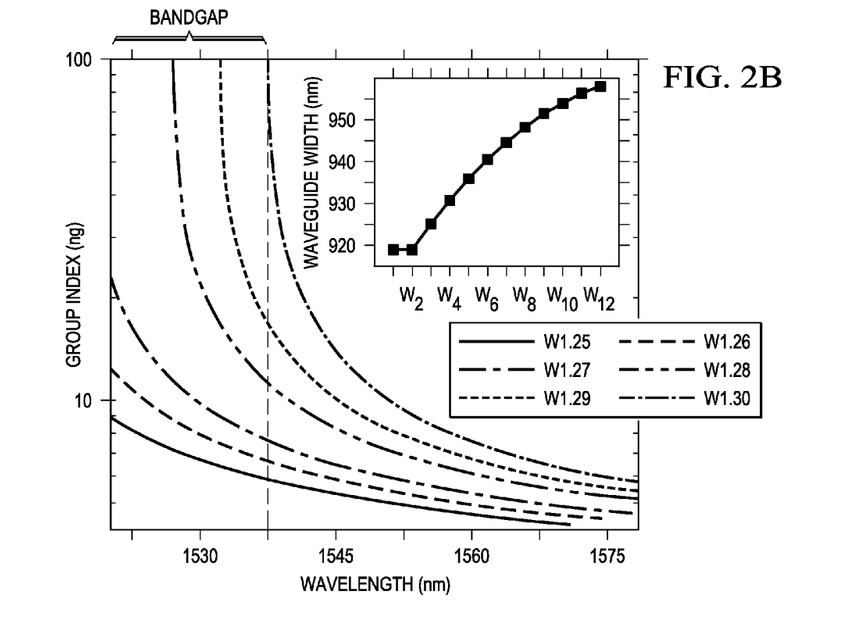
FIG. 2B is a plot of the group index versus wavelength in accordance with one embodiment of the present invention.
Figure 3A:
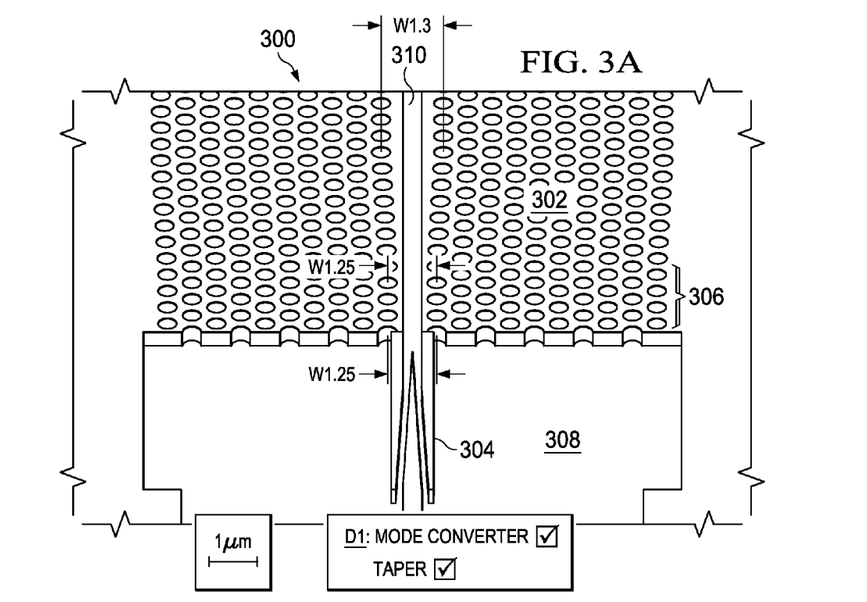
FIGS. 3A-3D show scanning electron microscope (SEM) pictures of the fabricated slotted PCW devices.
Figure 3B:
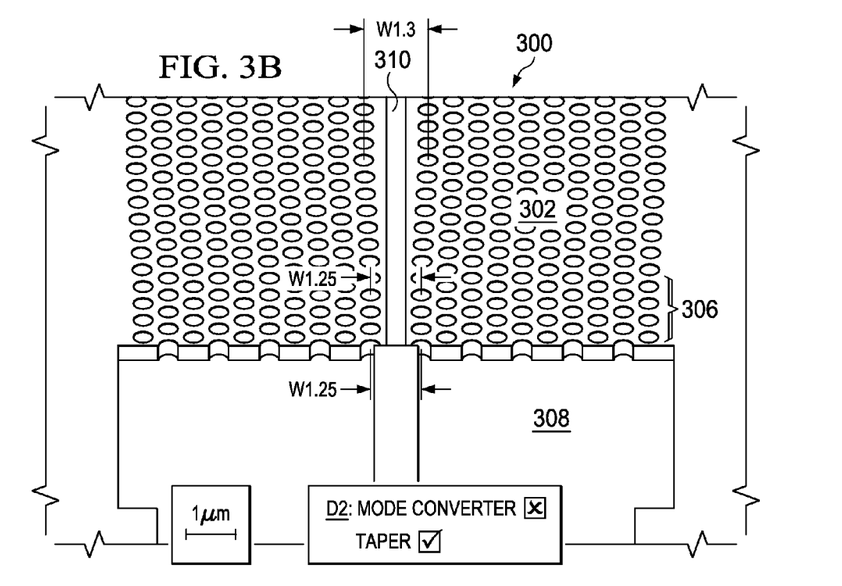
Figure 3C:
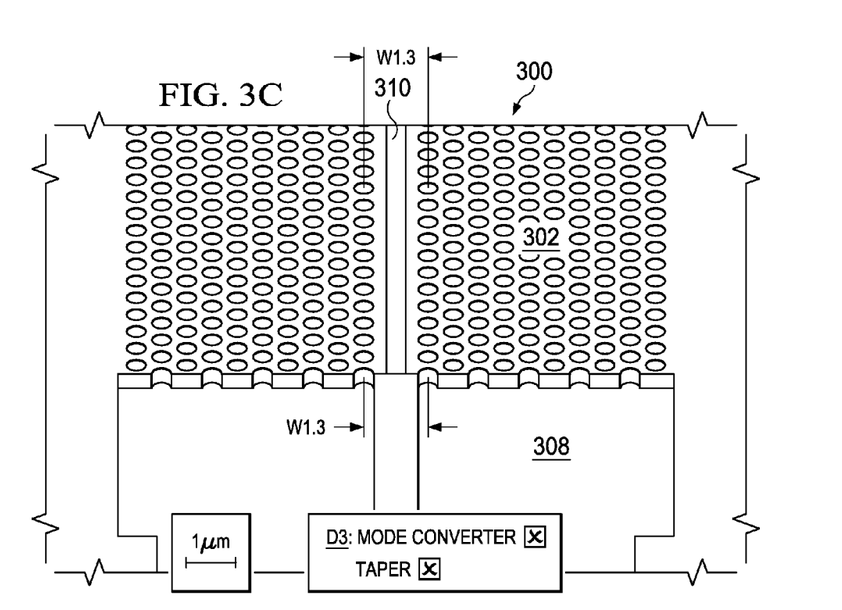
Figure 3D:
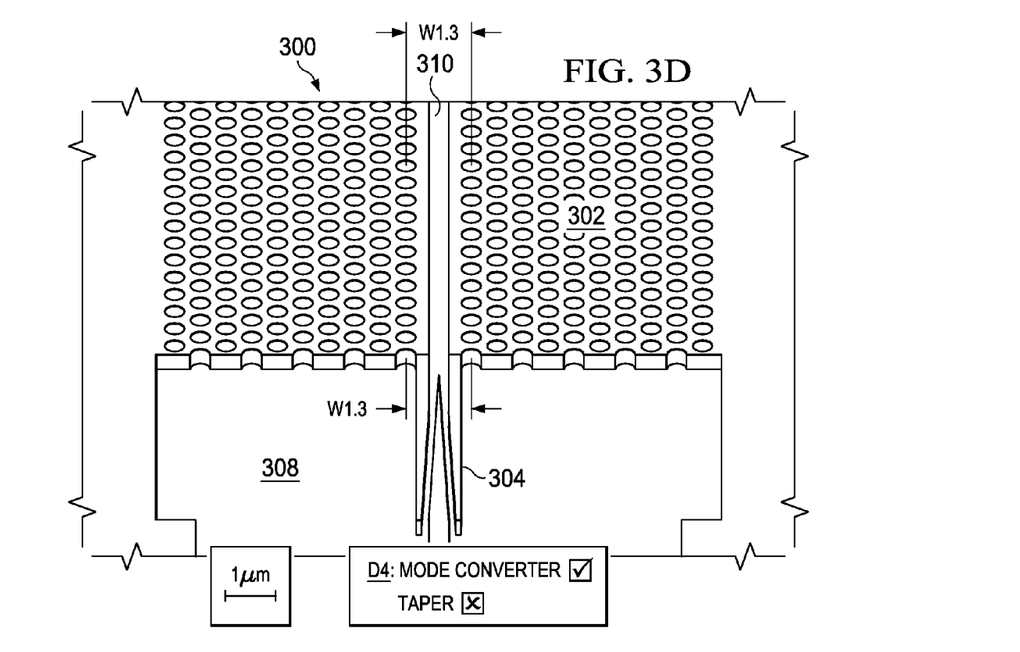

The group index mismatch can be adiabatically tuned by using a photonic crystal group index taper [13] 108 that provides a smooth transition in group index [14] for the guided mode as shown in FIG. 2B. The taper 108 is formed by parabolically reducing the width of a line defect waveguide 100 from $W_{12}=1.3\sqrt{3}a$ towards the coupling interface ($W_1=1.25\sqrt{3}a$) as shown schematically in FIG. 1. The parabolic photonic crystal taper 108 is designed by choosing a line defect waveguide width ($W_1$) that has lower group index than the slow light waveguide ($W_{12}$) over the entire guided mode spectrum followed by parabolic fitting to determine the waveguide widths ($W_2 \sim W_{11}$) between them. The taper design uses unified hole size, which is much easier to realize than the taper in [16]. It is worth nothing that these design principles based on mode profile matching and parabolic group index taper should work for narrower slots as well. However, narrower slots are more sensitive to sidewall roughness due to higher field intensity.

Slotted photonic crystal devices were fabricated on a silicon-on-insulator (SOI) wafer with 230 nm top silicon layer and 3 μm buried oxide (BOX). Details on the fabrication and characterization methods were described elsewhere.[4] Four different designs were fabricated to experimentally study the effect of mode matching and group index matching in a strip waveguide-slotted PCW coupling. Scanning electron microscopy pictures of the fabricated devices 300 are shown in FIGS. 3A-3D, which shows the differences of four designs. The PCW devices 300 designs comprise a nanometer-size center slot 310 embedded in a photonic crystal slab 302 on a silicon-dioxide layer 308. The designs in FIGS. 3A and 3B (designs D1 and D2) show a photonic crystal group index taper 306, a feature which is absent in FIGS. 3C and 3D (designs D3 and D4). Designs D1 and D4 (FIGS. 3A and 3D) also have an optical mode converter 304, a feature which is absent in FIGS. 3B and 3C (designs D2 and D3).

FIG. 4 shows the comparison of transmission spectra measured from the four different devices (D1-D4) in FIGS. 3A-3D and experimental $n_g$ value calculated from the fringes in D4 using the method described in [17]. These results highlight the importance of mode matching and impedance matching for achieving wide bandwidth, low loss, and group velocity independent coupling. The slow light and bandgap regions are both highlighted. Several distinct differences are observed in the transmission spectra. First, the transmission spectrum of D1 shows the best coupling efficiency, featuring lowest insertion loss of 2.4 dB around 1546.5 nm in reference to a strip waveguide of equal length on the same chip. Second, low frequency fringes due to Fabry-Perot reflections at the strip-Slotted PCW interface are suppressed. This results in a nearly flat and high transmission throughout the entire defect-guided mode spectrum. Third, comparing D1 to D4 demonstrates a 7 dB loss in coupling efficiency if impedance matching is not achieved. Fourth, the comparison between D1 and D3 shows the loss in transmission can be as high as 13 dB if both mode matching and impedance matching are not attempted. Fifth, the mode cut-off behavior is different for all four devices. The mode cut-off wavelengths of slotted PCW devices without mode converters (D2 and D3) happen at 1538.8 nm and 1538.4 nm, as opposed to 1537.3 nm and 1537.4 nm for devices that have mode converters (D1 and D4). The cutoff wavelength is a unique property of the guiding region, which is identical for D1 D4. This result illustrates that the coupling loss for slow light can be very high for nonoptimized structures and the importance of mode matching in order to efficiently couple light into the slow light mode near the band edge. To make sure that this difference in cut off wavelengths is not a result of fabrication error, careful SEM inspection was performed on three sets of samples to confirm that all devices are identical in the slow light waveguide region. The same measurement was also repeated multiple times on each set of samples. All measurements show identical trends with minor variations. Sixth, comparing the butt-coupling result of D3 to a previous butt-coupled result with a 95 nm slot width, the 320 nm wide slot has −15 dB transmission with 20 dB bandgap contrast, whereas the 95 nm wide slot has only −35 dB transmission and nearly indistinguishable bandgap contrast [9]. This clearly demonstrates that a wider slow light mode profile is much easier to couple with a strip waveguide mode. Finally, D2 shows the lowest coupling efficiency despite having the group index taper design. This is mainly due to the gradually decreasing waveguide width in the photonic crystal taper region. Without a mode converter to achieve mode matching, the narrower width of slotted PCW at the taper region can deteriorate the modal mismatch and cause low coupling efficiency when compared with the scenario shown in D3.

Figure 5:
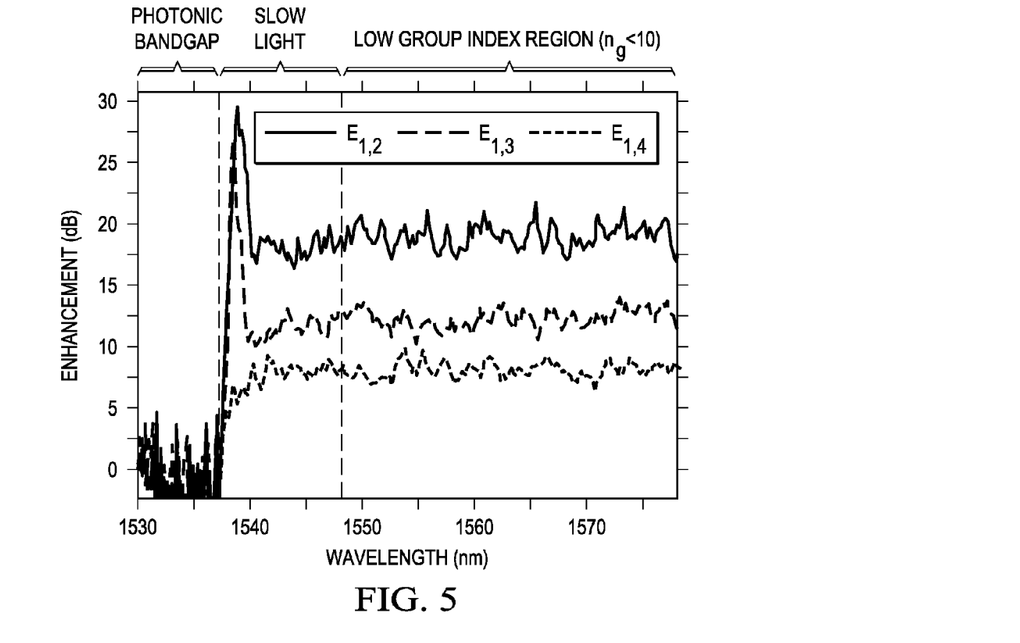
FIG. 5 shows the enhancement spectrum defined as the transmission difference between device D1 and other devices in accordance with one embodiment of the present invention.

In order to accurately depict the enhancement of coupling efficiency in the slow light region, the differences in transmission between the best case of D1 and others (D2, D3, and D4) are shown. FIG. 5 shows the enhancement spectrum defined as the transmission difference between device D1 and other devices in accordance with one embodiment of the present invention. It can be seen that the baseline in D1 is more than 17 dB ($E_{1,2}$ curve), 10 dB ($E_{1,3}$ curve), and 7 dB ($E_{1,4}$ curve) higher than D2, D3, and D4. The slow light and bandgap regions are both highlighted. The transmission enhancement in the high group index region around 1537 nm~1541 nm is even more significant. Curves $E_{1,2}$ and $E_{1,3}$ show strong enhancements of 30 dB and 27 dB within a 3 nm and a 2 nm spectrum next to the photonic bandgap. These results highlight the coupling efficiency enhancement in the most important region for the operation of slow light devices.

Figure 6:
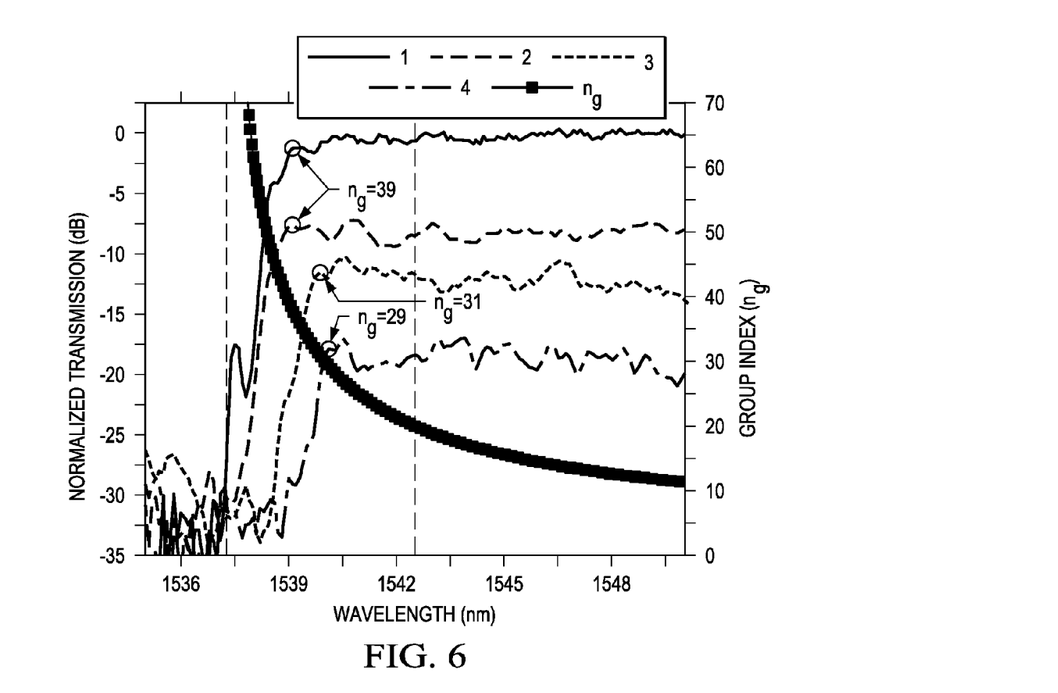
FIG. 6 is a plot showing the maximum group index to maintain efficient coupling in accordance with one embodiment of the present invention.

FIG. 6 is a plot showing the maximum group index to maintain efficient coupling in accordance with one embodiment of the present invention.

The design and experimental demonstration of efficient coupling into a slow light slotted photonic crystal waveguide is disclosed herein. Measurement results show up to 20 dB enhancement in overall coupling efficiency and up to 30 dB enhancement in the high group index region near the band edge. Suppression of low frequency fringes confirms that Fabry-Perot reflection at a strip-slotted PCW interface is minimized. A flat-top transmission spectrum and a 2.4 dB insertion loss for a 34 µm long slotted PCW represents the possibility to design devices that benefit from slow light enhancement without the classically high coupling loss associated with impedance or modal mismatch. Note that the present invention will work for slotted PCWs of any length.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the devices, compositions and/or methods disclosed and claimed herein can be made and executed without undue experimentation in light of the present disclosure. While the devices, compositions and methods of this invention have been described in terms of preferred embodiments, it will be apparent to those of skill in the art that variations may be applied to the devices, compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 7,231,122: Photonic Crystal Waveguides and Systems using Such Waveguides.
U.S. Pat. No. 7,535,944: Photonic Crystal/Waveguide Coupler for VCSELS and Photodetectors.
1. V. R. Almeida, Q. Xu, C. A. Barrios, and M. Lipson, Opt. Lett. 29, 1209 (2004).
2. T. Baba, Nature Photonics 2, 465 (2008).
3. T. F. Krauss, J. Phys. D: Appl. Phys. 40, 2666 (2007).
4. C.-Y. Lin, X. Wang, S. Chakravarty, B. S. Lee, W. Lai, J. Luo, A. K.-Y. Jen, and R. T. Chen, Appl. Phys. Lett. 97, 093304 (2010).
5. X. Wang, C.-Y. Lin, S. Chakravarty, J. Luo, A. K. Y. Jen, and R. T. Chen, Opt. Lett. 36, 882 (2011).
6. X. Chen, Y.-S. Chen, Y. Zhao, W. Jiang, and R. T. Chen, Opt. Lett. 34, 602 (2009).
7. W.-C. Lai, S. Chakravarty, X. Wang, C. Lin, and R. T. Chen, Opt. Lett. 36, 984 (2011).
8. W.-C. Lai, S. Chakravarty, X. Wang, C. Lin, and R. T. Chen, Appl. Phys. Lett. 98, 023304 (2011).
9. X. Chen, W. Jiang, J. Chen, L. Gu, and R. T. Chen, Appl. Phys. Lett. 91, 091111 (2007).
10. A. Di Falco, L. OiFaolain, and T. F. Krauss, Appl. Phys. Lett. 92, 083501 (2008).
11. A. Di Falco, L. O'Faolain, and T. F. Krauss, Photonics and Nanostructures—Fundamentals and Applications 6, 38 (2008).
12. Z. Wang, N. Zhu, Y. Tang, L. Wosinski, D. Dai, and S. He, Opt. Lett. 34, 1498 (2009).
13. C.-Y. Lin, X. Wang, S. Chakravarty, B. S. Lee, W.-C. Lai, and R. T. Chen, Appl. Phys. Lett. 97, 183302 (2010).
14. P. Pottier, M. Gnan, and R. M. De La Rue, Opt. Express 15, 6569 (2007).
15. M. G. Scullion, T. F. Krauss, and A. Di Falco, IEEE Photon. J. 3, 203 (2011).
16. J.-M. Brosi, C. Koos, L. C. Andreani, M. Waldow, J. Leuthold, and W. Freude, Optics Express 16, 4177 (2008).
17. Y. A. Vlasov and S. J. McNab, Opt. Lett. 31, 50 (2006).

What is claimed is:

1. An optical apparatus comprising a waveguide coupler configured to optically couple a strip waveguide to a first slot photonic crystal waveguide, wherein the slot photonic crystal waveguide has a lattice constant, an air hole diameter, a slot width and a first line defect waveguide width, wherein the waveguide coupler comprises:
   a group reflective index taper comprising a second slot photonic crystal waveguide disposed between and aligned with the first slot photonic crystal waveguide and the strip waveguide, wherein the second slot photonic crystal waveguide has a length, the lattice constant, the air hole diameter, the slot width, and a second line defect waveguide width that is substantially equal to the first line defect waveguide width adjacent to the first slot photonic crystal waveguide and the second line defect waveguide width increases along the length of the second photonic crystal waveguide from the strip waveguide to the first slot photonic crystal waveguide.

2. The optical apparatus as recited in claim 1, wherein the second line defect waveguide width decreases parabolically.

3. The optical apparatus as recited in claim 1, wherein the first line defect waveguide width is about $1.3\sqrt{3}a$ and the second line defect waveguide width decreases to about $1.25\sqrt{3}a$ where a is the lattice constant.

4. The optical apparatus as recited in claim 1, wherein the length of the second slot photonic crystal waveguide is determined by a maximum difference between the first line defect waveguide width and the second line defect waveguide width.

5. The optical apparatus as recited in claim 1, wherein the length of the second slot photonic crystal waveguide is about 5.1 μm or less.

6. The optical apparatus as recited in claim 1, further comprising:
the strip waveguide has a tapered end with a gradually decreasing width; and
an optical mode converter disposed between and aligned with the strip waveguide and the group reflective index taper, wherein the optical mode converter comprises two side waveguides on each side of at least a portion of the tapered end of the strip waveguide and positioned in close proximity to the tapered end of the strip waveguide, wherein a width of each side waveguide gradually decreases from the group reflective index taper to an end of the side waveguide.

7. The optical apparatus as recited in claim 6, wherein a length of the optical mode converter is about 5.95 μm or less.

8. The optical apparatus as recited in claim 6, wherein the apparatus improves a coupling efficiency from the strip waveguide to the first photonic crystal waveguide by about 20 dB (baseline) and by about 30 dB in a slow light region.

9. The optical apparatus of claim 1, wherein the first photonic crystal waveguide and the second photonic crystal waveguide comprise:
a slab of a first material on a substrate;
a slot formed in the slab; and
a first array of columnar members formed of a second material within the slab on both sides of the slot in the first photonic crystal waveguide; and
a second array of columnar members formed of the second material within the slab on both sides of the slot in the second photonic crystal waveguide, wherein the positioning of the columnar member in the second array are altered to achieve the decreasing second line defect waveguide width.

10. The optical apparatus as recited in claim 9, wherein:
the slot is filled with at least one of silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, intrinsic silicon, alloys thereof, and organic polymers;
the first material comprises at least one of silicon, germanium, carbon, gallium nitride, gallium arsenide, gallium phosphide, indium nitride, indium phosphide, aluminum arsenide, zinc oxide, silicon oxide, silicon nitride, alloys thereof, and organic polymers; and
the second material comprises a least one of air, silicon oxide, silicon nitride, alumina, zinc oxide, alloys thereof, and organic polymers.

11. The optical apparatus as recited in claim 1, wherein the optical apparatus is integrated into a sensor, an optical communication system, a router, a modulator, a switch, a tunable optical filter or a fully embedded board level interconnect.

12. The optical apparatus as recited in claim 1, wherein the optical apparatus is integrated into a sensor, and one or more samples are deposited within at least a portion of the first photonic crystal waveguide or the second photonic crystal waveguide.

13. The optical apparatus as recited in claim 12, wherein the one or more samples comprise analytes, environmental pollutants, greenhouse gases, water pollutants, contaminants, or any combinations thereof.

14. An optical apparatus comprising:
a photonic crystal waveguide comprising a slab formed of a first material on a substrate, and a slot formed in the slab;
a first region of the photonic crystal waveguide having a first line defect waveguide width and a first array of columnar members formed of a second material within the slab on both sides of the slot; and
a second region of the photonic crystal waveguide adjacent to the first region, wherein the second region has a length, a second line defect waveguide width that is substantially equal to the first line defect waveguide width adjacent to the first region and increases along the length of the second region from an end of the second region to the first region, and a second array of columnar members formed of the second material within the slab on both sides of the slot, wherein the positioning of the columnar members in the second array are altered to achieve the increasing second line defect waveguide width from end of the second region to the first region.

15. The optical apparatus as recited in claim 14, wherein the second line defect waveguide width decreases parabolically.

16. The optical apparatus as recited in claim 14, wherein the first line defect waveguide width is about $1.3\sqrt{3}a$ and the second line defect waveguide width decreases to about $1.25\sqrt{3}a$ where a is a lattice constant.

17. The optical apparatus as recited in claim 14, wherein the length of the second region is determined by a maximum difference between the first line defect waveguide width and the second line defect waveguide width.

18. The optical apparatus as recited in claim 14, wherein the length of the second region is about 5.1 μm or less.

19. The optical apparatus as recited in claim 14, further comprising:
a strip waveguide having a tapered end with a gradually decreasing width aligned with the slot; and
an optical mode converter disposed between and aligned with the strip waveguide and the second region of the photonic crystal waveguide, wherein the optical mode converter comprises two side waveguides on each side of at least a portion of the tapered end of the strip waveguide and positioned in close proximity to the tapered end of the strip waveguide, wherein a width of each side waveguide gradually decreases from the group reflective index taper to an end of the side waveguide.

20. The optical apparatus as recited in claim 19, wherein a length of the optical mode converter is about 5.95 μm or less.

21. The optical apparatus as recited in claim 19, wherein the apparatus improves a coupling efficiency from the strip waveguide to the first photonic crystal waveguide by about 20 dB (baseline) and by about 30 dB in a slow light region.

22. The optical apparatus as recited in claim 14, wherein:

the slot is filled with at least one of silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, intrinsic silicon, alloys thereof, and organic polymers;

the first material comprises at least one of silicon, germanium, carbon, gallium nitride, gallium arsenide, gallium phosphide, indium nitride, indium phosphide, aluminum arsenide, zinc oxide, silicon oxide, silicon nitride, alloys thereof, and organic polymers; and the second material comprises a least one of air, silicon oxide, silicon nitride, alumina, zinc oxide, alloys thereof, and organic polymers.

23. The optical apparatus as recited in claim 14, wherein the optical apparatus is integrated into a sensor, an optical communication system, a router, a modulator, a switch, a tunable optical filter or a fully embedded board level interconnect.

24. The optical apparatus as recited in claim 14, wherein the optical apparatus is integrated into a sensor, wherein one or more samples are deposited within at least a portion of the slot or deposited within one or more of the columnar members within the first region or the second region.

25. The optical apparatus as recited in claim 24, wherein the one or more samples comprise analytes, environmental pollutants, greenhouse gases, water pollutants, contaminants, or any combinations thereof.

\* \* \* \* \*